US009847875B1

(12) United States Patent
Berzin et al.

(10) Patent No.: US 9,847,875 B1
(45) Date of Patent: Dec. 19, 2017

(54) METHODS AND SYSTEMS FOR BOOTSTRAPPING AN END-TO-END APPLICATION LAYER SESSION SECURITY KEYSET BASED ON A SUBSCRIBER IDENTITY MASTER SECURITY CREDENTIAL

(71) Applicant: Verizon Patent and Licensing Inc., Arlington, VA (US)

(72) Inventors: Oleg Berzin, Huntingdon Valley, PA (US); Yueping Zhang, Princeton, NJ (US); Praveen Venkataramu, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/187,771

(22) Filed: Jun. 20, 2016

(51) Int. Cl.
*H04L 9/08* (2006.01)
*H04W 12/04* (2009.01)
(Continued)

(52) U.S. Cl.
CPC .......... *H04L 9/0847* (2013.01); *H04L 63/168* (2013.01); *H04W 8/183* (2013.01); *H04W 12/04* (2013.01); *H04W 12/06* (2013.01)

(58) Field of Classification Search
CPC ..... H04W 12/06; H04W 12/04; H04W 4/005; H04W 12/02; H04L 63/0853; H04L 63/08;
(Continued)

(56) References Cited

U.S. PATENT DOCUMENTS

2007/0101122 A1\* 5/2007 Guo ...................... H04L 63/061
713/153
2013/0103522 A1\* 4/2013 Lodeweyckx ...... H04L 12/1407
705/26.1
(Continued)

OTHER PUBLICATIONS

ETSI 3rd Generation Partnership Project (3GPP), Technical Specification, 3GPP TS 33.220 version 13.0.0; *Digital cellular telecommunications system* (Phase 2+); Universal Mobile Telecommunications System (UMTS); LTE; Generic Bootstrapping Architecture (GAA); Generic Bootstrapping Architecture (GBA), Jan. 2016.

*Primary Examiner* — Vladimir Magloire
*Assistant Examiner* — Ernest Tacsik

(57) ABSTRACT

An exemplary security key bootstrapping system determines an application layer session security keyset uniquely associated with a client device and based on a subscriber identity master security credential. The subscriber identity master security credential is permanently stored within a component of the client device and is also stored on a subscriber identity management server associated with a provider network by which the client device is communicatively coupled with an application server system. The security key bootstrapping system uses the application layer session security keyset as a credential to provide end-to-end security for an application layer session between the client device and the application server system over the provider network. Neither the component of the client device nor the subscriber identity management server obtains the subscriber identity master security credential from an exchange of the subscriber identity master security credential over the provider network.

20 Claims, 10 Drawing Sheets

(51) Int. Cl.
*H04W 12/06* (2009.01)
*H04W 8/18* (2009.01)
*H04L 29/06* (2006.01)

(58) Field of Classification Search
CPC .......... H04L 2463/061; H04L 63/0428; H04L 63/062; H04L 63/061; H04L 63/0869; H04L 9/0844; H04L 9/3271
See application file for complete search history.

(56) References Cited

U.S. PATENT DOCUMENTS

2015/0049713 A1* 2/2015 Lan .................... H04L 25/0224
370/329
2016/0226828 A1* 8/2016 Bone .................... H04L 63/062

* cited by examiner

METHODS AND SYSTEMS FOR BOOTSTRAPPING AN END-TO-END APPLICATION LAYER SESSION SECURITY KEYSET BASED ON A SUBSCRIBER IDENTITY MASTER SECURITY CREDENTIAL

BACKGROUND INFORMATION

Wireless communication network technologies continue to advance. For example, wireless communication service providers such as mobile phone service providers are deploying and expanding provider networks (e.g., Long Term Evolution ("LTE") wireless communication networks) that are configured to provide not only voice services, but also data services whereby various computing devices connected to the provider networks (e.g., client devices, application servers, etc.) may exchange data over the provider networks. Thus, along with supporting voice calls between cell phones and/or other telephonic devices, provider networks may also support the exchange of data between various types of client devices (e.g., cell phones, tablet computers, Internet of Things ("IoT") devices, etc.) and application servers to allow the client devices, for example, to access data services provided by the application servers, to report data or receive updates from the application servers, and the like.

In many examples, it may be desirable for data communications on a provider network to be secure (e.g., to prevent unwanted dissemination of data, to prevent fraud, etc.). Accordingly, the provider network may provide security for a connection between a client device and one or more network elements (e.g., a firewall, a virtual private network ("VPN") concentrator, etc.) located within the provider network. Additionally, various security procedures and technologies including, for example, Transport Layer Security ("TLS"), Secure Sockets Layer ("SSL"), HyperText Transfer Protocol Secure ("HTTPS"), Datagram Transport Layer Security ("DTLS"), and Internet Protocol Security ("IPSec"), among others, may be used in situations where end-to-end application layer session security (i.e., security that extends from applications running on the client device all the way to applications running on the application server) may be required.

Unfortunately, security protocols that do not extend from end-to-end on an application layer session between a mobile device and an application server may provide insufficient security for many situations (e.g., for fully securing application layer sessions). Moreover, existing end-to-end application layer session security technologies may involve various aspects (e.g., transferring certificates, authenticating certificates by certificate authorities, managing public and private keys, exchanging multiple messages to derive session keys, etc.) that require inordinate amounts of processing and that will not scale sufficiently to keep up with increasing numbers of client devices that are being connected to provider networks. In particular, along with continual increases in the number of subscribers that use provider networks to operate personal mobile devices such as cell phones, provider networks are increasingly being used to host an enormous proliferation of IoT devices that are expected to eventually dwarf the current number of client devices currently connected to the provider networks. As such, security technologies that may have been sufficient in the past may increasingly be found lacking as the future unfolds.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
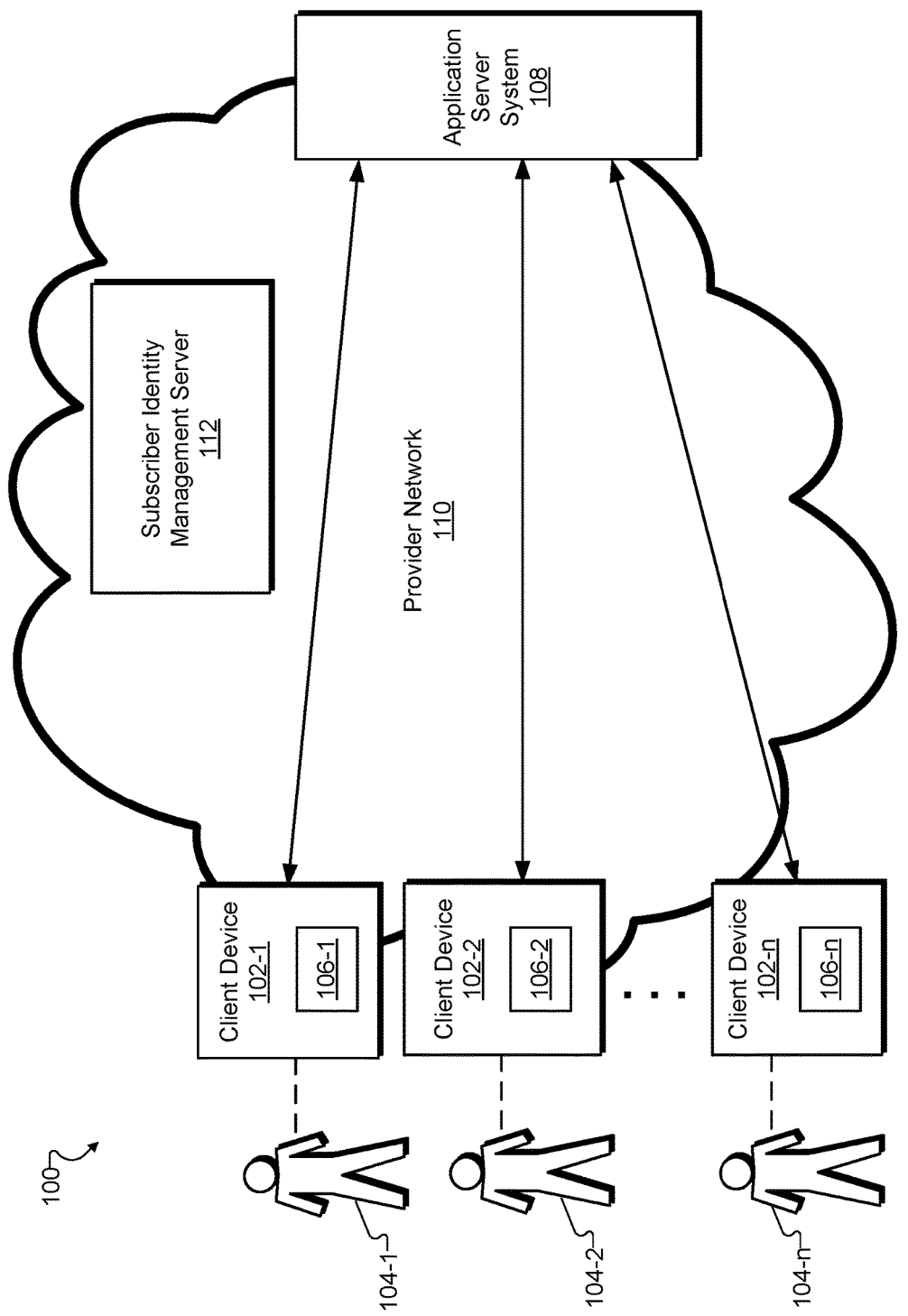
FIG. 1 illustrates an exemplary configuration in which exemplary client devices communicate with an exemplary application server system over a provider network to bootstrap an end-to-end application layer session security keyset based on a subscriber identity master security credential according to principles described herein.

Methods and systems for bootstrapping an end-to-end application layer session security keyset based on a subscriber identity master security credential are described herein. An application layer session may include any communication session between two computing devices (e.g., a client device and an application server system) that involves exchanging data between respective software modules (e.g., software applications) running on the computing devices. For example, the application layer session may involve communications that are associated with the application layer (i.e., Layer 7) of the Open Systems Interconnection model of networking ("the OSI model") and that are exchanged (e.g., over a provider network) between software applications running on respective computing devices. In some examples, application layer sessions may refer, in whole or in part, to communications (e.g., packets, messages, data sequences, connections, etc.) and/or communication sessions that are associated with a layer of the OSI model other than the application layer (e.g., Layers 1-6) or that do not strictly adhere to the OSI model. As such, end-to-end application layer session security may refer to any aspect (e.g., protocols, techniques, standards, etc.) of securing one or more communications (e.g., messages) exchanged within an application layer session between two computing devices.

As will be described and illustrated below, a security key bootstrapping system may determine an application layer session security keyset. More particularly, the security key bootstrapping system may independently determine or derive the application layer session security keyset for use in establishing end-to-end application layer session security for an application layer session between a client device (e.g., a mobile device, an Internet of Things ("IoT") device, etc.) and an application server system over a provider network. In certain implementations, the application layer session security keyset may be uniquely associated with the client device and may be based on a subscriber identity master security credential. For example, the subscriber identity master security credential may be permanently stored within a component of the client device (e.g., within a Subscriber Identity Module ("SIM") or the like). Additionally, the subscriber identity master security credential may be stored on a subscriber identity management server associated with the provider network by which the client device is communicatively coupled with the application server system. For example, as will be described below, the provider network may be a Long Term Evolution ("LTE") network and the subscriber identity management server may be a Home Subscriber Server ("HSS") associated with the LTE network.

Subsequent to determining the application layer session security keyset, the security key bootstrapping system may use the application layer session security keyset as a credential to provide end-to-end security for an application layer session between the client device and the application server system over the provider network. For example, the application layer session security keyset may be used as a credential (e.g., a pre-shared key) in an end-to-end application layer session security procedure that uses technologies such as Transport Layer Security ("TLS"), Secure Sockets Layer ("SSL"), HyperText Transfer Protocol Secure ("HTTPS"), Datagram Transport Layer Security ("DTLS"), Internet Protocol Security ("IPSec"), and/or any other technology as may serve a particular implementation.

While both the client device and the application server system may obtain and use the application layer session security keyset in order to effect (e.g., provide, facilitate, etc.) the end-to-end application layer session security, the application layer session security keyset may be independently obtained and/or derived by both the client device and by the application server system. For example, the client device may derive the application layer session security keyset based on the subscriber identity master security credential stored in the component of the client device, while the application server system may obtain the application layer session security keyset from the subscriber identity management server after the subscriber identity management server independently derives the application layer session security keyset based on the same subscriber identity master security credential that is stored thereon.

In this way, neither the component of the client device (e.g., the SIM) nor the subscriber identity management server may obtain the subscriber identity master security credential from an exchange of the subscriber identity master security credential over the provider network or over any other network. Rather, as will be described below, the component of the client device may be manufactured having the subscriber identity master security credential permanently stored (e.g., hardwired, hardcoded, etc.) thereon, and the subscriber identity management server may receive the subscriber identity master security credential directly from the producer (e.g., manufacturer, seller, etc.) of the component of the client device in a secure communication (e.g., in a direct data transfer that does not use any network, or at least does not use the provider network connecting the client device and the application server system).

By bootstrapping the application layer session security keyset to provide end-to-end application layer session security in this way, the security key bootstrapping system may provide various advantages to the provider network, to one or more application server systems on the provider network, to one or more client devices on the provider network, as well as to users and operators of these devices, systems, and networks. For example, in contrast to communication security typically provided by provider networks (e.g., from a client device to the provider network, from the client device to a particular element of the provider network, etc.), the application layer session security keyset may be used in a full end-to-end application layer session security scheme that ensures that communications are secured all the way from, for example, an application running on a client device to a corresponding application running on an application server system in communication with the client device. As such, users of the client device and/or the application server system will enjoy a decreased risk of fraud and/or of sensitive data being compromised, as a result of the application layer session between the client device and the application server system.

Moreover, end-to-end application layer session security based on the application layer session security keyset bootstrapped by the security key bootstrapping system as described herein may significantly reduce processing, memory, battery, and/or other resources that client devices, application server systems, provider networks, and/or other systems (e.g., third party systems such as certificate authority systems) may otherwise utilize to perform typical end-to-end application layer session security procedures. For example, by using the application layer session security keyset as a credential in an end-to-end application layer session security procedure, the security key bootstrapping system may reduce or completely eliminate the transmission and updating of certificates, public keys, private keys, and/or other messages between the systems and devices described above. Accordingly, by reducing the workload of the systems and devices in this way, the security key bootstrapping system may facilitate a more efficient use of system and network resources that may scale effectively as large numbers of new devices (e.g., IoT devices) are added to provider networks.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary configuration 100 in which exemplary client devices communicate with an exemplary application server system over a provider network to bootstrap an end-to-end application layer session security keyset based on a subscriber identity master security credential. As shown in configuration 100, client devices 102 (e.g., client devices 102-1 through 102-*n*) may each be associated with a user 104 (e.g., with users 104-1 through 104-*n*, respectively) and may include a component 106 (e.g., components 106-1 through 106-n, respectively) upon which a subscriber identity master security credential may be permanently stored. Client devices 102 may be communicatively coupled with an application server system 108 (e.g., to facilitate application layer sessions between client devices 102 and application server system 108) via a provider network 110 that includes a subscriber identity management server 112. Each of the components in configuration 100 will now be described in more detail.

Client devices 102 may include any suitable devices that may connect to and exchange (i.e., send and/or receive) data over a provider network such as provider network 110. For example, client devices may include traditional types of mobile devices (e.g., smart phones, tablet computers, cell phones, mobile readers, music players, personal digital assistants, digital cameras or video cameras, etc.), wearable devices (e.g., smart watches and other smart clothing, health monitoring equipment, etc.), or other types of computing devices (e.g., laptop computers, mobile hotspots, etc.) that may be configured to communicate over provider network 110 in a particular implementation. In some examples, client devices 102 may be associated with (e.g., used by) one or more users 104, as illustrated in configuration 100. For example, client device 102-1 may be a smart phone owned and used by user 104-1 to place and receive voice calls, as well as to send and receive data (e.g., application data used by applications running on the smart phone) over provider network 110 (e.g., a cellular network).

In certain examples, client devices 102 may include IoT devices. As used herein, the "Internet of Things" refers to a network of physical objects (i.e., "things") that are designed to include embedded electronic systems (e.g., hardware and software systems) that allow the objects to collect and exchange data, and to otherwise interact with one another and with the world around the objects. For example, IoT devices may include objects such as traditional electronic devices (e.g., mobile devices and other client devices described above), as well as objects that have not been traditionally associated with embedded electronic systems and/or network connectivity such as vehicles, buildings, household appliances, clothing, and the like.

In some examples, IoT devices may include sensors for measuring physical phenomena in the world that may be reported to other systems (e.g., over a provider network). For example, a plurality of IoT devices (e.g., a large number of IoT devices) may be positioned along a transcontinental oil pipeline and used to monitor various events (e.g., stress events, temperature events, rupture events, etc.) along the pipeline and to report data (e.g., diagnostic data) related to the events to a system associated with an owner or operator of the pipeline and configured to monitor and track the condition of the pipeline. Similar distributions of IoT devices may similarly facilitate monitoring the condition of various other types of applications such as railroad tracks, highways, power lines, submarine communication cables, oil wells, and the like. In some examples, IoT devices may be relatively small (e.g., microelectromechanical systems ("MEMS")), inexpensive, and/or disposable such that large numbers of IoT devices may intercommunicate between themselves and with other systems (e.g., application server systems).

Thus, as IoT devices are more commonly used in existing and new applications, the total number of client devices 102 that may be connected to provider network 110 may grow very large and require efficient communication techniques (e.g., communication security techniques) such as those described herein. It will be understood that while client devices 102 are each illustrated in configuration 100 as being associated with exactly one user 104, certain client devices 102 (e.g., smart buildings, smart appliances, etc.) may be associated with a plurality of users 104 while other client devices 102 (e.g., sensor IoT devices distributed along a structure such as an oil pipeline) may not be associated with any user 104.

Client devices 102 may include any suitable software that may facilitate the client devices 102 to perform their respective functions in a particular implementation. For example, certain client devices 102 may run primitive software or no software, while other client devices 102 may include sophisticated operating systems (mobile operating systems) that allow the client devices 102 to run several sophisticated applications (e.g., mobile apps) at once. Client devices 102 may also include any user-manipulable input devices (e.g., keyboards, touch screens, etc.) and/or user-perceivable output devices (e.g., display screens, speakers, etc.) as may serve a particular implementation. While certain client devices 102 (e.g., client devices 102 that are not associated with a user 104) may receive data input (e.g., instructions) and transmit data output (e.g., measurements) via input/output devices such as network interface devices, these client devices 102 may not include any user-manipulable input devices or user-perceivable output devices such as those mentioned above.

Application server system 108 may comprise one or more servers or other computing devices configured to exchange data (e.g., application data) over provider network 110 with one or more of client devices 102. Application server system 108 may be associated with an entity that provides or is otherwise associated with software (e.g., application software) running on client devices 102. For example, in some examples, application server system 108 may be managed and/or operated by a communication service provider (e.g., a network service provider, a cable service provider, a satellite service provider, an Internet service provider, etc.) that manages and/or operates provider network 110. In other examples, application server system 108 may be managed and/or operated by entities other than the communication service provider. For example, application server system 108 may be managed and/or operated by an entity that provides application software that provides services to client devices 102 or by an entity that owns and operates client devices 102. To illustrate, in the example described above where client devices 102 included the plurality of IoT devices positioned along the transcontinental oil pipeline and configured to measure and report data related to conditions of the pipeline, application server system 108 may be managed and/or operated by the company that owns and/or manages the oil pipeline and the IoT sensor devices placed along the pipeline.

In some examples, application server system 108 may store sensitive data received by one of client devices 102. For example, client device 102-1 may receive sensitive data (e.g., personal data) from user 104-1, and may transmit the sensitive data to application server system 108 during an application layer session (e.g., a secured application layer session). Similarly, referring again to the oil pipeline example described above, the entity that manages the oil pipeline and the client devices 102 placed along the oil pipeline may consider the data measured by the devices to be sensitive data (e.g., proprietary data) that should not be disseminated other than to application server system 108 when the data is transmitted over provider network 110. To this end, as will be described below, it may be desirable for application layer sessions between application server system 108 and one or more of client devices 102 to be secured. For example, it may be desirable to apply end-to-end application layer session security to one or more application layer sessions between application server system 108 and client devices 102 via provider network 110.

Client devices 102 and application server system 108 may communicate with one another using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), LTE, Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Provider network 110 may include any provider-specific network (e.g., a cable or satellite carrier network or a mobile telephone network), the Internet, wide area network, or any other suitable network. Data may flow between client devices 102, application server system 108, and/or any other devices or systems that may be connected to provider network 110 by way of network 110 using any communication technologies, devices, media, and/or protocols as may serve a particular implementation. While only one network 110 is shown to interconnect client devices 102 and application server system 108 in FIG. 1, it will be recognized that client devices 102 and application server system 108 may intercommunicate by way of multiple interconnected networks as may serve a particular implementation. As will be described below, in some implementations, provider network 110 may include an LTE network (e.g., a 4G LTE network) configured to provide data service to a plurality of subscribers (e.g., users 104) via an Evolved Packet Core ("EPC") framework.

In order to bootstrap an end-to-end application layer session security keyset based on a subscriber identity master security credential, client devices 102 may each include a respective component 106, as shown in FIG. 1. Within each component 106, a subscriber identity master security credential may be permanently stored (e.g., hardcoded, hardwired, etc.). For example, the subscriber identity master security credential may include an identification code (e.g., a number) that is uniquely assigned to a particular component 106 and that is distinct from identification codes that are assigned to (e.g., and permanently stored within) other components 106.

In some examples, each component 106 may be a removable SIM (i.e., also referred to as a "SIM card") that is installed in each client device 102. As such, the subscriber identity master security credential may be permanently associated with the SIM such that the subscriber identity master security credential would be associated with a first client device 102 (e.g., client device 102-1) as long as the SIM was installed within the first client device 102, but could later be associated with a second, different client device 102 (e.g., client device 102-2) if the SIM were removed from the first client device 102 and installed within the second client device 102. In other examples, one or more of components 106 may be implemented as non-removable storage components built into client devices 102. For example, rather than being permanently stored within a removable SIM that could be associated with different client devices 102 at different times, the subscriber identity master security credential may be permanently stored (e.g., hardcoded, hardwired, etc.) within a non-removable storage component such as a read-only memory ("ROM") (e.g., a programmable read-only memory ("PROM"), an electronically-erasable programmable read-only memory ("EEPROM"), etc.) that is built into (e.g., soldered onto a circuit board within) one of client devices 102.

Subscriber identity management server 112 may include one or more servers or other suitable computing devices used to maintain and manage subscriber identity information for client devices 102, users 104, and/or other entities associated with provider network 110. As such, subscriber identity management server 112 may track devices and systems as the devices and systems connect and/or disconnect from provider network 110 and perform authentication and authorization tasks for specific devices (e.g., client devices 102) and/or subscribers using the devices (e.g., users 104). While a single subscriber identity management server 112 is illustrated in configuration 100, it will be understood that, in certain implementations, a plurality of subscriber identity management servers (e.g., distributed subscriber identity management servers) may be used to handle a large implementation of provider network 110 or an implementation of provider network 110 with a large number of devices. In implementations where a plurality of subscriber identity management servers are used, a subscriber location function may be used to map locations and/or virtual addresses of subscribers and/or devices on provider network 110.

Subscriber identity management server 112 may be associated with provider network 110 in any way that may serve a particular implementation. For example, subscriber identity management server 112 may be managed and/or operated by the same communication service provider that manages and/or operates provider network 110. As will be described below, in some examples, subscriber identity management server 112 may include or be implemented by an HSS within an LTE network.

In operation, subscriber identity management server 112 may facilitate securing an application layer session between a particular client device 102 (e.g., client device 102-1) and application server system 108. For example, subscriber identity management server 112 may determine an application layer session security keyset (e.g., that may be used for end-to-end application layer session security for the application layer session) independently from a determination of the same application layer session security keyset by one of client devices 102, and may provide the application layer session security keyset to application server system 108.

More specifically, as will be described in more detail below, a particular client device 102 such as client device 102-1 may determine an application layer session security keyset based on a subscriber identity master security credential permanently stored within component 106-1. In order to facilitate various subscriber identity operations performed by subscriber identity management server 112, the producer (e.g., manufacturer, seller, etc.) of component 106-1 may also securely distribute the subscriber identity master security credential permanently stored in component 106-1 to subscriber identity management server 112. For example, the producer of component 106-1 may, at the time that component 106-1 is created or sold, directly load the subscriber identity master security credential onto one or more servers associated with subscriber identity management server 112 rather than transmitting the subscriber identity master security credential to subscriber identity management server 112 over a network such as provider network 110. In other examples, the subscriber identity master security credential may be securely distributed to subscriber identity management server 112 in other ways as may serve a particular implementation.

Based on the secure and independent distribution of the subscriber identity master security credential, subscriber identity management server 112 may, like component 106-1, store a copy of the subscriber identity master security credential associated with client device 102-1 (i.e., associated with component 106-1). Client device 102-1 and subscriber identity management server 112 may each independently determine an application layer session security keyset based on the subscriber identity master security credential, and subscriber identity management server 112 may securely transmit the application layer session security keyset to application server system 108. For example, as will be described in more detail below, subscriber identity management server 112 may transmit the application layer session security keyset over a trusted network (e.g., a sub-network of provider network 110 that is not accessible by the public) or via another trusted connection with application server system 108.

Once client device 102-1 and application server system 108 each have the application layer session security keyset, the application layer session security keyset may be used as a credential to provide end-to-end security for an application layer session between client device 102-1 and application server system 108 over provider network 110. For example, client device 102-1 and/or application server system 108 may use the application layer session security keyset for integrity protection of the application layer session and/or for ciphering of the application layer session.

By bootstrapping the application layer session security keyset in this way, end-to-end security for the application layer session between client device 102-1 and application server system 108 described in the example above may be established without transferring or authenticating certificates or engaging in excessive message transferring associated with certain protocols whereby pre-shared keys may otherwise be transferred. Moreover, this bootstrapping of the application layer session security keyset may facilitate or eliminate the need for separate device authentication of client device 102-1 with application server system 108 because any data transferred by application server system 108 within the application layer session may be encrypted using a key that is unique to client device 102-1 (e.g., or, more specifically, that is unique to component 106-1). Accordingly, the encrypted data may be indecipherable and meaningless to any other device (e.g., any client device 102 other than client device 102-1) that receives or intercepts the data, minimizing the risk of an unintended and/or unauthenticated recipient device accessing the data.

Figure 2:
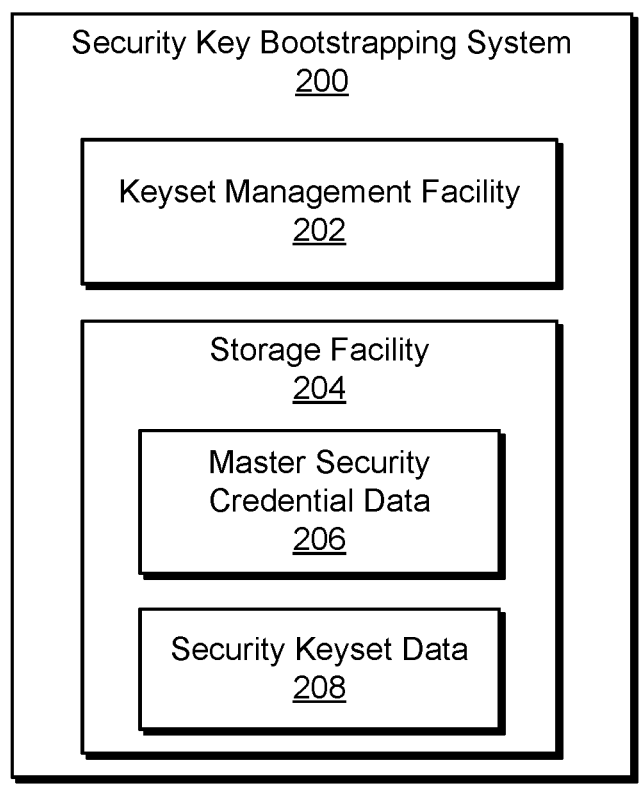
FIG. 2 illustrates an exemplary security key bootstrapping system that may bootstrap an end-to-end application layer session security keyset based on a subscriber identity master security credential according to principles described herein.

FIG. 2 illustrates an exemplary security key bootstrapping system 200 ("system 200") that may bootstrap an end-to-end application layer session security keyset based on a subscriber identity master security credential. As shown, system 200 may include, without limitation, a keyset management facility 202 and a storage facility 204 selectively and communicatively coupled to one another. It will be recognized that although facilities 202 and 204 are shown to be separate facilities in FIG. 2, facilities 202 and 204 may be combined into a single facility or divided into more facilities as may serve a particular implementation.

System 200 may be implemented by or may include one or more devices and/or systems described above in relation to FIG. 1. For example, system 200 may be implemented entirely by one or more of client devices 102, entirely by application server system 108, or by one of client devices 102 or application server system 108 in combination with one or more elements of provider network 110 (e.g., subscriber identity management server 112). In certain implementations, system 200 may be distributed across multiple systems or devices such that, for example, system 200 may be implemented by elements of application server system 108, provider network 110, and one or more client devices 102 all operating together. As will be described in more detail below, system 200 may bootstrap an end-to-end application layer session security keyset based on a subscriber identity master security credential by determining the application layer session security keyset based on a subscriber identity master security credential and using the application layer session security keyset as a credential to provide end-to-end security for an application layer session (e.g., between one of client devices 102 and application server system 108) over provider network 110.

Storage facility 204 may maintain master security credential data 206 and security keyset data 208, as well as any other data received, generated, managed, maintained, used, and/or transmitted by keyset management facility 202 or other components of system 200 as may serve a particular implementation.

Master security credential data 206 may include data representative of one or more subscriber identity master security credentials and/or data facilitating the use of the subscriber identity master security credentials in determining an application layer session security keyset. For example, if system 200 is implemented by or includes a client device 102 such as client device 102-1, master security credential data 206 may be associated with (e.g., may include or be implemented by) component 106-1 and may include the subscriber identity master security credential permanently stored on component 106-1 and any other data used by component 106-1 and/or client device 102-1 to determine an application layer session security keyset based on the subscriber identity master security credential.

As another example, if system 200 is implemented by or includes application server system 108, master security credential data 206 may be an optional component. For example, application server system 108 may not need to store or process any subscriber identity master security credential because application server system 108 may receive an application layer session security keyset from subscriber identity management server 112, rather than itself determining the application layer session security keyset.

As yet another example, if system 200 includes subscriber identity management server 112 (e.g., in an implementation that also includes, for example, application server system 108), master security credential data 206 may be associated with (e.g., may include or be implemented by) a storage component within subscriber identity management server 112 that maintains one or more subscriber identity master security credentials of various client devices 102 connected to provider network 110. For example, master security credential data 206 may represent a database of subscriber identity master security credentials securely received from a producer (e.g., manufacturer, seller, etc.) of components 106 as described above.

Security keyset data 208 may include data representative of one or security keysets (e.g., application layer session security keysets) and/or data facilitating the use of the security keysets in providing end-to-end application layer session security for an application layer session. For example, if system 200 is implemented by or includes a client device 102 such as client device 102-1, security keyset data 208 may be determined by and/or stored within client device 102-1 and/or within component 106-1 in particular. As another example, if system 200 is implemented by or includes application server system 108, security keyset data 208 may be received from subscriber identity management server 112 and stored within application server system 108. As yet another example, if system 200 includes subscriber identity management server 112 (e.g., in an implementation that also includes, for example, application server system 108), security keyset data 208 may be stored within a memory or storage component of subscriber identity management server 112 that maintains one or more application layer session security keysets determined based on subscriber identity master security credentials of various client devices 102 connected to provider network 110.

Keyset management facility 202 may perform any operations for bootstrapping an end-to-end application layer session security keyset based on a subscriber identity master security credential as may serve a particular implementation. For example, if system 200 is implemented by or includes a client device 102 such as client device 102-1, keyset management facility 202 may use component 106-1 and/or other components of client device 102-1 to determine an application layer session security keyset based on a subscriber identity master security credential permanently stored within component 106-1. Keyset management facility 202 may then use the application layer session security keyset as a credential to provide end-to-end security for an application layer session between client device 102-1 and application server system 108 by using the application layer session security keyset within client device 102-1 to encrypt data sent by client device 102-1 and/or to decrypt data received by client device 102-1 in any way as may serve a particular implementation (e.g., as a pre-shared key in a security procedure as described below).

As another example, if system 200 is implemented by or includes application server system 108, keyset management facility 202 may determine an application layer session security keyset by requesting and receiving the application layer session security keyset from subscriber identity management server 112, as will be described in more detail below. Keyset management facility 202 may then use the received application layer session security keyset as a credential to provide end-to-end security for an application layer session between application server system 108 and a client device 102 such as client device 102-1 by using the application layer session security keyset within application server system 108 to encrypt data being sent to client device 102-1 and/or to decrypt data received from client device 102-1 in any way as may serve a particular implementation (e.g., as a pre-shared key in a security procedure as described below).

As yet another example, if system 200 includes subscriber identity management server 112 (e.g., in an implementation that also includes, for example, application server system 108), keyset management facility 202 may use subscriber identity management server 112 to determine an application layer session security keyset based on a subscriber identity master security credential stored within subscriber identity management server 112 (e.g., a subscriber identity master security credential securely distributed to subscriber identity management server 112 by a producer of components 106). Keyset management facility 202 may then use the application layer session security keyset as a credential to provide end-to-end security for an application layer session between application server system 108 and a client device 102 such as client device 102-1 by transmitting the application layer session security keyset from subscriber identity management server 112 to application server system 108 and using the application layer session security keyset within application server system 108. For example, keyset management facility 202 may use the application layer session security keyset to encrypt data being sent to client device 102-1 and/or to decrypt data received by application server system 108 from client device 102-1 in any way as may serve a particular implementation (e.g., as a pre-shared key in a security procedure as described below).

To illustrate how system 200 may bootstrap an end-to-end application layer session security keyset based on a subscriber identity master security credential, various examples will now be provided. The particular examples below illustrate an exemplary configuration in which client devices 102 communicate with application server system 108 over an LTE provider network (see FIG. 3); an exemplary dataflow between client devices 102, application server system 108, and various components of the LTE provider network (see FIG. 4); and several exemplary security procedures that make use of a bootstrapped application layer session security keyset to provide end-to-end application layer session security (see FIGS. 5-7).

Figure 3:
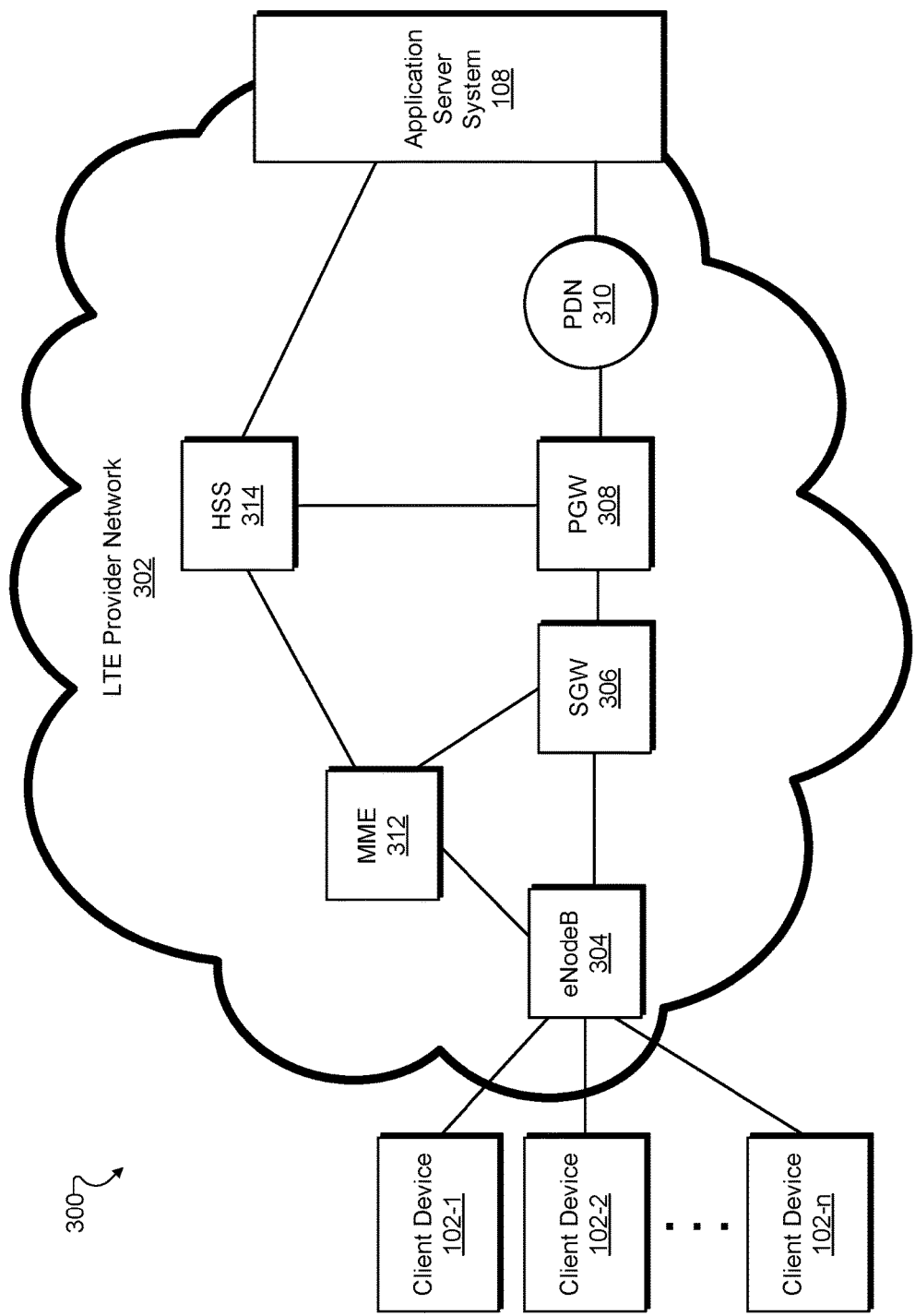
FIG. 3 illustrates an exemplary configuration in which the client devices of FIG. 1 communicate with the application server system of FIG. 1 over an exemplary LTE provider network to bootstrap an end-to-end application layer session security keyset based on a subscriber identity master security credential according to principles described herein.

FIG. 3 illustrates an exemplary configuration 300 in which client devices 102 communicate with application server system 108 over an exemplary LTE provider network 302 to bootstrap an end-to-end application layer session security keyset based on a subscriber identity master security credential. As illustrated in FIG. 3, configuration 300 may be a specific implementation (e.g., a more detailed implementation) of configuration 100 described above in relation to FIG. 1. In particular, in place of provider network 110 described above, configuration 300 includes LTE provider network 302, which may be configured to provide data and/or voice services to a plurality of client devices (e.g., client devices 102) and/or subscribers (e.g., users 104, not explicitly shown in configuration 300) via an EPC framework.

For example, as shown, in the EPC framework of LTE provider network 302, client devices 102 are connected to a E-UTRAN Node B ("eNodeB" or "eNB") 304, which is communicatively coupled with a serving gateway (or "SGW") 306. Serving gateway 306 is further communicatively coupled with a packet data network ("PDN") gateway ("PDN Gateway" or "PGW") 308, which acts as a gateway to a PDN 310 by which application server system 108 is communicatively coupled to LTE provider network 302. Additionally, eNodeB 304 is communicatively coupled to a mobile management entity ("MME") 312. In configuration 300, an HSS 314 associated with the EPC framework of LTE provider network 302 and configured to store profile data representative of the plurality of subscribers is used as the subscriber identity management server 112 described above in relation to FIG. 1. As shown, HSS 314 may be communicatively coupled to MME 312, PGW 308, and application server system 108.

Client devices 102 may communicate with eNodeB 304 using wireless radio signaling to access LTE provider network 302. While configuration 300 shows a single eNodeB 304, it will be understood that a plurality of eNBs may be positioned at different geographical locations to allow client devices 102 located in and moving between various geographical locations to each connect and stay connected to LTE provider network 302 by way of wireless radio signaling with a particular eNodeB within a vicinity of the current location of each client device 102. In some examples, client devices 102, one or more eNBs (e.g., eNodeB 304), and an air interface such as an Evolved Universal Terrestrial Radio Access interface may together form an Evolved Universal Terrestrial Radio Access Network ("E-UTRAN") that connects to the EPC of LTE provider network 302.

For example, as shown, eNodeB 304 may be communicatively coupled with SGW 306. SGW 306 may route and forward data (e.g., application data) between eNodeB 304 and PGW 308. In turn, PGW 308 may provide connectivity from LTE network 402 to one or more external packet data networks (i.e., PDN 310), including network domains in which application server systems such as application server system 108 are located.

Along with providing a pathway for application data (e.g., data related to an application layer session between client devices 102 and application server system 108) with SGW 306 and PGW 308, eNodeB 304 may also be communicatively coupled with MME 312, which may be communicatively coupled with HSS 314. MME 312 may act as a key control node for LTE provider network 302, and, as such, may be responsible for activating and deactivating client devices 102 (e.g., selecting SGW 306 from a plurality of SGWs at an initial attach of client devices 102 to LTE provider network 302 or at a time of handover from one eNodeB to another) and authenticating client devices 102 (e.g., by interacting with HSS 314, as described below). For example, in cooperation with HSS 314, MME 312 may handle security key management for ciphering and integrity protection for non-access stratum ("NAS") signaling, radio resource control ("RRC") signaling, user plane data, etc., on LTE provider network 302. MME 312 may additionally be configured to handle security key management for application layer session security keysets as described herein, and/or may perform other operations as may serve a particular implementation of LTE provider network 302.

HSS 314 may include a central database with user and/or subscription-related information (e.g., relating to one or more of users 104, not explicitly shown in FIG. 3). As such, HSS 314 may communicate with MME 312 to support various mobility management tasks (e.g., user authentication, access authorization, etc.) and to facilitate establishing voice calls and/or data sessions (e.g., application layer sessions).

As will be described in more detail below, signaling data may be exchanged between HSS 314, MME 312, and client devices 102 (e.g., via eNodeB 304) to bootstrap an application layer session security keyset. For example, in certain implementations, system 200 may include or be implemented by client device 102-1, including component 106-1 (not explicitly shown in FIG. 3) installed within client device 102-1. In such implementations, system 200 may determine the application layer session security keyset by receiving (e.g., by component 106-1 of client device 102-1) an authentication vector associated with a key derivation function of an Evolved Packet System-Authorization and Key Agreement ("EPS-AKA") algorithm. For example, system 200 may receive the authentication vector from a subscriber identity management server such as HSS 314 through a security key management system such as MME 312.

In certain examples, the authentication vector for the key derivation function of the EPS-AKA algorithm may be one authentication vector in a plurality of authentication vectors that system 200 receives from the subscriber identity management server through the security key management system. For example, the EPS-AKA algorithm may be used within LTE client device initialization procedures to determine various keys (e.g., associated with various keysets) used for ciphering and/or integrity protection of NAS signaling, RRC signaling, user plane data, etc., and, accordingly, system 200 (e.g., client device 102-1) may receive a plurality of authentication vectors to enable system 200 to determine a plurality of keys or keysets including the application layer session security keyset.

Upon receiving the authentication vector from the subscriber identity management server (e.g., HSS 314), system 200 (e.g., client device 102-1) may compute, based on the authentication vector and further based on the subscriber identity master security credential permanently stored within component 106-1 of client device 102-1, the application layer session security keyset. The computing of the application layer session security keyset may be performed in accordance with the key derivation function of the EPS-AKA algorithm and may be performed independently from a second computing of the application layer session security keyset performed by the subscriber identity management server (e.g., by HSS 314). In certain examples, the computing of the application layer session security keyset may be performed along with the computing of other keys based on other authentication vectors received by client device 102-1 (e.g., keys used for ciphering and/or integrity protection of NAS signaling, RRC signaling, user plane data, etc., as described above).

In other implementations, signaling data may be exchanged between HSS 314 and application server system 108 to bootstrap the application layer session security keyset. For example, as will be described in more detail below, system 200 may include or be implemented by a subscriber identity management server such as HSS 314, as well as an application server system such as application server system 108. In these implementations, system 200 may determine the application layer session security keyset by transmitting (e.g., by HSS 314 through MME 312) an authentication vector associated with a key derivation function of an EPS-AKA algorithm to component 106-1 of client device 102-1. Then, based on the same authentication vector transmitted and further based on the subscriber identity master security credential stored on HSS 314, system 200 (e.g., HSS 314) may then compute the application layer session security keyset. For example, system 200 may compute the application layer session security keyset in accordance with the key derivation function of the EPS-AKA algorithm.

While an application layer session security keyset computed in this way may be identical to an application layer session security keyset computed by client device 102-1 (e.g., because both are based on the same authentication vector and on the same subscriber identity master security credential), the computing of the application layer session security keyset performed by HSS 314 may be performed independently from the computing of the application layer session security keyset performed by client device 102-1 (e.g., by component 106-1). Specifically, both HSS 314 and client device 102-1 may perform the computing of the application layer session security keyset separately using independent copies of the subscriber identity master security credential (i.e., copies that were not obtained or received from one another).

In these implementations, once system 200 determines the application layer session security keyset (e.g., within HSS 314), the application layer session security keyset may be transmitted to application server system 108 in any suitable way. For example, HSS 314 may be communicatively coupled with the application server system via a trusted network connection over which a request for the application layer session security keyset may be transmitted by application server system 108 and over which the application layer session security keyset may be transmitted by HSS 314. As shown in configuration 300, the trusted network connection (i.e., the connection between HSS 314 and application server system 108) may be separate from one or more network connections by which client devices 102 are communicatively coupled with application server system 108 (i.e., the connections between client devices 102 and application server system 108 that pass through eNodeB 304, SGW 306, PGW 308, and PDN 310). In some examples, the trusted network connection between HSS 314 and application server system 108 may be associated with (e.g., may include and/or make use of) a Diameter-based interface, a customized application programming interface ("API"), or another suitable means of securely transferring data between HSS 314 and application server system 108 that may serve a particular implementation.

HSS 314 may receive from application server system 108 (e.g., over the trusted network connection), a request to transmit the application layer session security keyset to application server system 108 over the trusted network connection. For example, the request may include a key identifier representative of the application layer session security keyset. As will be described below, the key identifier may comprise an identification number assigned to the application layer session security keyset at the time the application layer session security keyset was computed and may be obtained by application server system 108 from client device 102-1 over the one or more network connections by which the client device is communicatively coupled with the application server system. In response to the request and based on the key identifier, HSS 314 may transmit the application layer session security keyset to application server system 108 over the trusted network connection.

Figure 4:
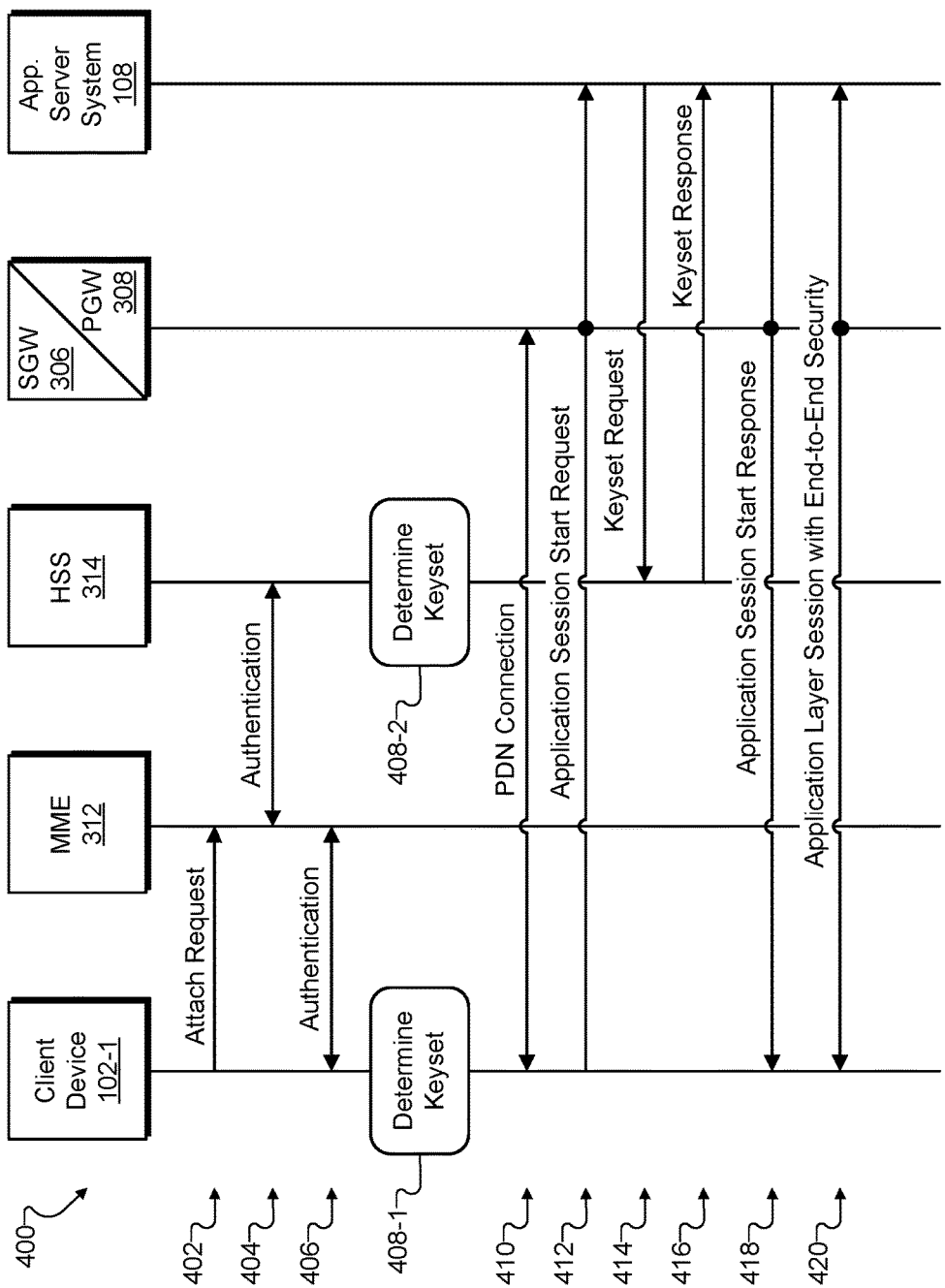
FIG. 4 illustrates an exemplary dataflow between a particular client device of FIG. 1, the application server system of FIG. 1, and certain components of the LTE provider network of FIG. 3, whereby an application layer session security keyset based on a subscriber identity master security credential is bootstrapped to facilitate end-to-end security for an application layer session according to principles described herein.

To illustrate the exchange of data between various components of configuration 300, FIG. 4 illustrates an exemplary dataflow 400 between a particular client device 102 (i.e., client device 102-1), application server system 108, and certain components of LTE provider network 302. Dataflow 400 illustrates one example of how an application layer session security keyset based on a subscriber identity master security credential may be bootstrapped to facilitate end-to-end application layer session security for an application layer session. Specifically, dataflow 400 illustrates a flow of data between client device 102-1, MME 312, HSS 314, SGW 306, PGW 308, and application server system 108.

As described above, system 200 may be configured to determine an application layer session security keyset and use the application layer session security keyset as a credential for end-to-end security for an application layer session between a client device and an application server system over a provider network. As further described above, in various implementations, system 200 may include and/or be implemented by one or more of client devices (e.g., by client device 102-1), by an application server system (e.g., by application server system 108), by a combination of a subscriber identity management server and an application server system (e.g., by a combination of HSS 314 and application server system 108), and/or by any other combination of devices and/or systems as may serve a particular implementation. In FIG. 4, dataflow 400 will illustrate an exemplary flow of data (e.g., messages, keys, requests, responses, etc.) in relation to systems and/or devices exchanging the data, but without respect to which system(s) and/or device(s) may implement system 200 as system 200 is defined herein (e.g., as the entity that determines and/or uses the application layer session security keyset). Rather, it will be understood that various possible implementations of system 200 may be incorporated into the following description of dataflow 400.

Dataflow 400 illustrates a plurality of data exchanges (e.g., data exchanges 402, 404, 406, 410, 412, 414, 416, 418, and 420), as well as data determinations (e.g., data determinations 408-1 and 408-2) whereby an application layer session security keyset may be bootstrapped for use in providing end-to-end security for an application layer session. Each data exchange and data determination will now be described in more detail.

In data exchange 402, client device 102-1 may send an attach request to MME 312. Data exchange 402 may be transmitted by client device 102-1 over a wireless radio signal to MME 312 via an eNodeB such as eNodeB 304 in FIG. 3. Data exchange 402 may include an indication that client device 102-1 is attempting to connect to LTE provider network 302, and may request that MME 312 authenticate client device 102-1 and/or a user associated with client device 102-1 (e.g., user 104-1 of FIG. 1).

In response, MME 312 may communicate with HSS 314 in data exchange 404, and may communicate with client device 102-1 in data exchange 406. In data exchanges 404 and 406, MME 312 may execute conventional authentication procedures (e.g., using an EPS-AKA algorithm) to authenticate client device 102-1 and/or a user of client device 102-1 with LTE provider network 302 and attach client device 102-1 to LTE provider network 302. For example, as described above, MME 312 may obtain one or more authentication vectors associated with one or more key derivation functions of the EPS-AKA algorithm from HSS 314 (e.g., in data exchange 404), and may provide the authentication vectors to client device 102-1 (e.g., in data exchange 406). As described above, the authentication vectors may be associated with (e.g., used to derive) one or more keys or keysets such as those used for ciphering and integrity protection for NAS signaling, RRC signaling, user plane data, and the like. Additionally, MME 312 may receive (e.g., within data exchange 404) and/or transmit (e.g., within data exchange 406) one or more authentication vectors associated with an application layer session security keyset. Because multiple keys and keysets may be determined, each key and/or keyset may be associated with (e.g., assigned) a unique key identifier that is representative of the respective key or keyset and that is stored within client device 102-1 along with the respective keys and/or keysets.

In data determinations 408 (e.g., data determinations 408-1 and 408-2), client device 102-1 and HSS 314 may each independently determine the application layer session security keyset. For example, client device 102-1 may determine the application layer session security keyset based on an authentication vector received from HSS 314 through MME 312 (e.g., received in data exchange 406) and further based on a subscriber identity master security credential permanently stored within a component (e.g., component 106-1) of client device 102-1. Client device 102-1 may compute the application layer session security keyset in accordance with a key derivation function of an EPS-AKA algorithm (e.g., a similar key derivation function used to derive or compute other keys such as those used for ciphering and integrity protection of NAS signaling, RRC signaling, user plane data, etc.). In some examples, component 106-1 of client device 102-1 may compute the application layer session security keyset. In other examples, one or more other components of client device 102-1 may compute the application layer session security keyset based on the subscriber identity master security credential permanently stored within component 106-1.

Independently of data determination 408-1, HSS 314 may perform data determination 408-2 to independently determine the same application layer session security keyset determined in data determination 408-1. Specifically, HSS 314 may determine the application layer session security keyset based on the same authentication vector that HSS 314 provided to MME 312 (e.g., in data exchange 404) and further based on a copy of the subscriber identity master security credential stored on HSS 314 (e.g., a copy securely distributed to HSS 314 by a producer of component 106-1 and/or client device 102-1 as described above). Like client device 102-1 in data determination 408-1, HSS 314 may independently compute the application layer session security keyset in accordance with the key derivation function of the EPS-AKA algorithm in data determination 408-1. Also like client device 102-1, HSS 314 may determine or derive a plurality of others keys (e.g., keys used for ciphering and integrity protection of NAS signaling, RRC signaling, user plane data, etc.) and may associate (e.g., assign) unique key identifiers to each of the keys and keysets in the same way as client device 102-1.

Accordingly, after data determinations 408 have both been performed, client device 102-1 and HSS 314 may each maintain (e.g., store) one or more keys and keysets each associated with unique key identifiers. Among the keys and keysets maintained by client device 102-1 and HSS 314, the application layer session security keyset may be maintained with a unique key identifier representative of the application layer session security keyset.

Once client device 102-1 has successfully attached to LTE provider network 302, client device 102-1 may establish a PDN connection whereby data may be exchanged between client device 102-1 and one or more devices and systems connected to various packet domains. For example, as illustrated by data exchange 410, client device 102-1 may exchange data with systems and devices on PDN 310 via SGW 306 and PGW 308. As illustrated in FIG. 3, and as indicated in FIG. 4 by "line jumps" where data exchange 410 crosses over MME 312 and HSS 314, data exchanged as part of data exchange 410 (e.g., application data, etc.) may follow a different path than data exchanged as part of other data exchanges described above. For example, the data of data exchange 410 may be transmitted directly from an eNodeB (not explicitly shown in FIG. 4) to which client device 102-1 is connected to SGW 306 and PGW 308 without passing through MME 312 and/or HSS 314.

In data exchange 412, client device 102-1 may attempt to initiate an application layer session with application server system 108 by sending an application session start request. In some examples, data exchange 412 may include the key identifier representative of the application layer session security keyset, along with other bootstrapping parameters used to initiate the application layer session. As shown, the start request (including the key identifier) may be transmitted over one or more connections that include SGW 306 and PGW 308 but do not include MME 312 and/or HSS 314.

In response to the start request of data exchange 412, application server system 108 may send a keyset request to HSS 314 to request the application layer session security keyset (e.g., the application layer session security keyset determined by HSS 314 in data determination 408-2), as shown by data exchange 414. As mentioned above, application server system 108 may communicate with HSS 314 via a trusted network connection (e.g., a connection that includes or makes use of a Diameter-based interface, a customized API, etc.). Application server system 108 may include the unique key identifier representative of the application layer session security keyset with the keyset request of data exchange 414 so that HSS 314 can identify the proper keyset (e.g., the application layer session security keyset) that is being requested by application server system 108 from a plurality of keys and/or keysets that HSS 314 may maintain.

In response, HSS 314 may use the key identifier received in data exchange 414 to identify the application layer session security keyset, and may transmit the application layer session security keyset to application server system 108 over the trusted network connection in data exchange 416. At this point, both client device 102-1 and application server system 108 have the application layer session security keyset.

After obtaining the application layer session security keyset from HSS 314, application server system 108 may respond to the application session start request (e.g., received from client device 102-1 in data exchange 412) with an application session start response in data exchange 418. As with data exchange 412, data exchange 418 may travel through SGW 306 and/or SGW 308 but may not pass through MME 312 and/or HSS 314.

Finally, as illustrated by data exchange 420, client device 102-1 and application server system 108 may communicate with one another in an application layer session with end-to-end security based on the application layer session security keyset determined based on the subscriber identity master security credential. One or more of the data exchanges and data determinations described above may be repeated each time a client device 102 attaches to a provider network and/or each time the client device 102 initiates an application layer session with an application server system 108.

Client device 102-1 and application server system 108 may use the application layer session security keyset as a credential to provide or facilitate end-to-end application layer session security in any suitable way. For example, system 200 (e.g., client device 102-1, application server system 108, etc.) may use the application layer session security keyset as a pre-shared key in a Transport Layer Security-Pre-Shared Key ("TLS-PSK") procedure or to seed a Diffie-Hellman ("DH") session key derivation for the TLS-PSK procedure. Additionally or alternatively, system 200 may use the application layer session security keyset as a pre-shared key in an Internet Protocol Security ("IPSec") procedure that involves or does not involve an Internet Key Exchange ("IKE") procedure, or in a Datagram Transport Layer Security ("DTLS") procedure.

Figure 5:
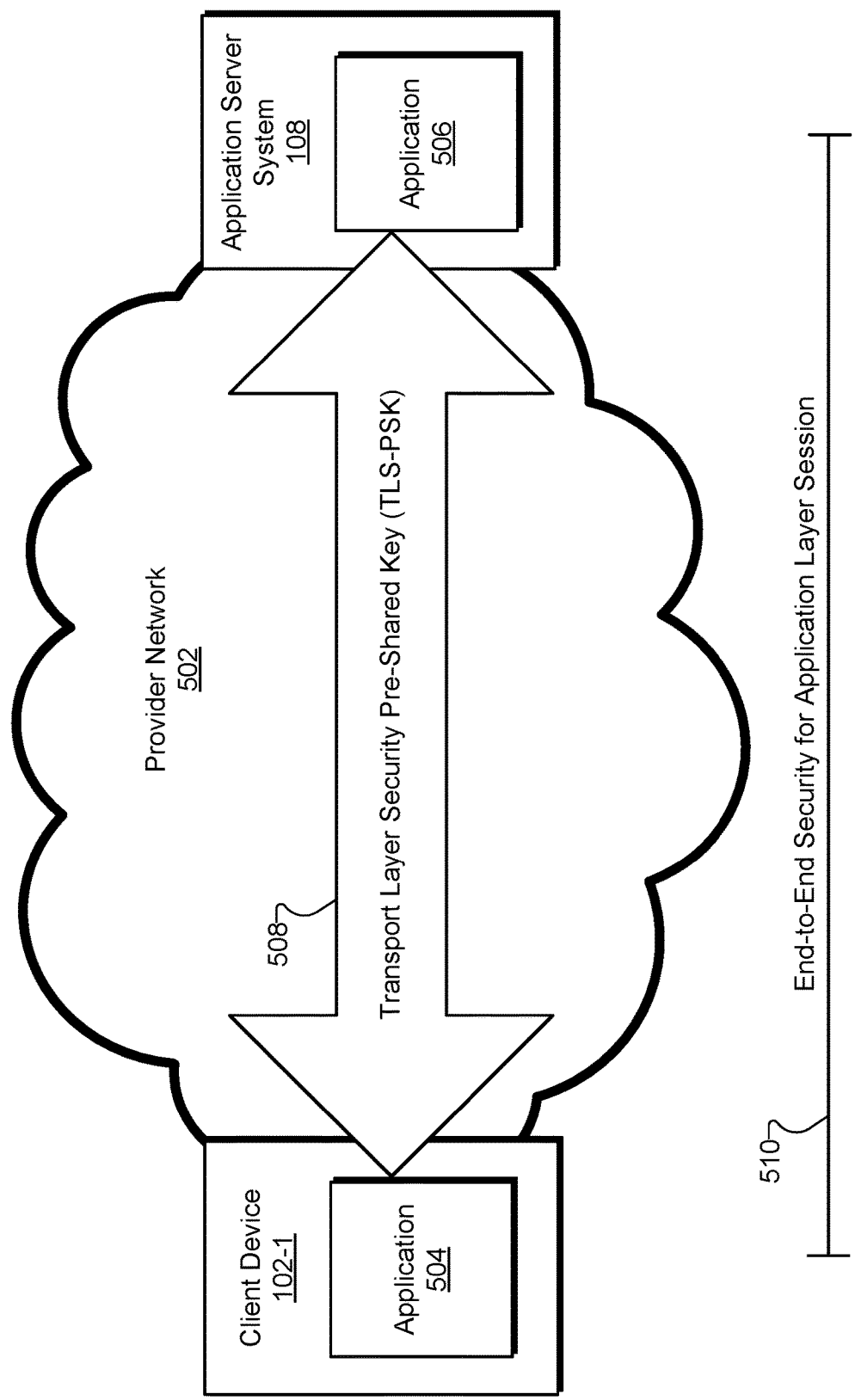
FIGS. 5-7 illustrate exemplary security procedures that make use of a bootstrapped application layer session security keyset to provide end-to-end application layer session security between an application running on a client device and an application running on an application server system according to principles described herein.
Figure 6:
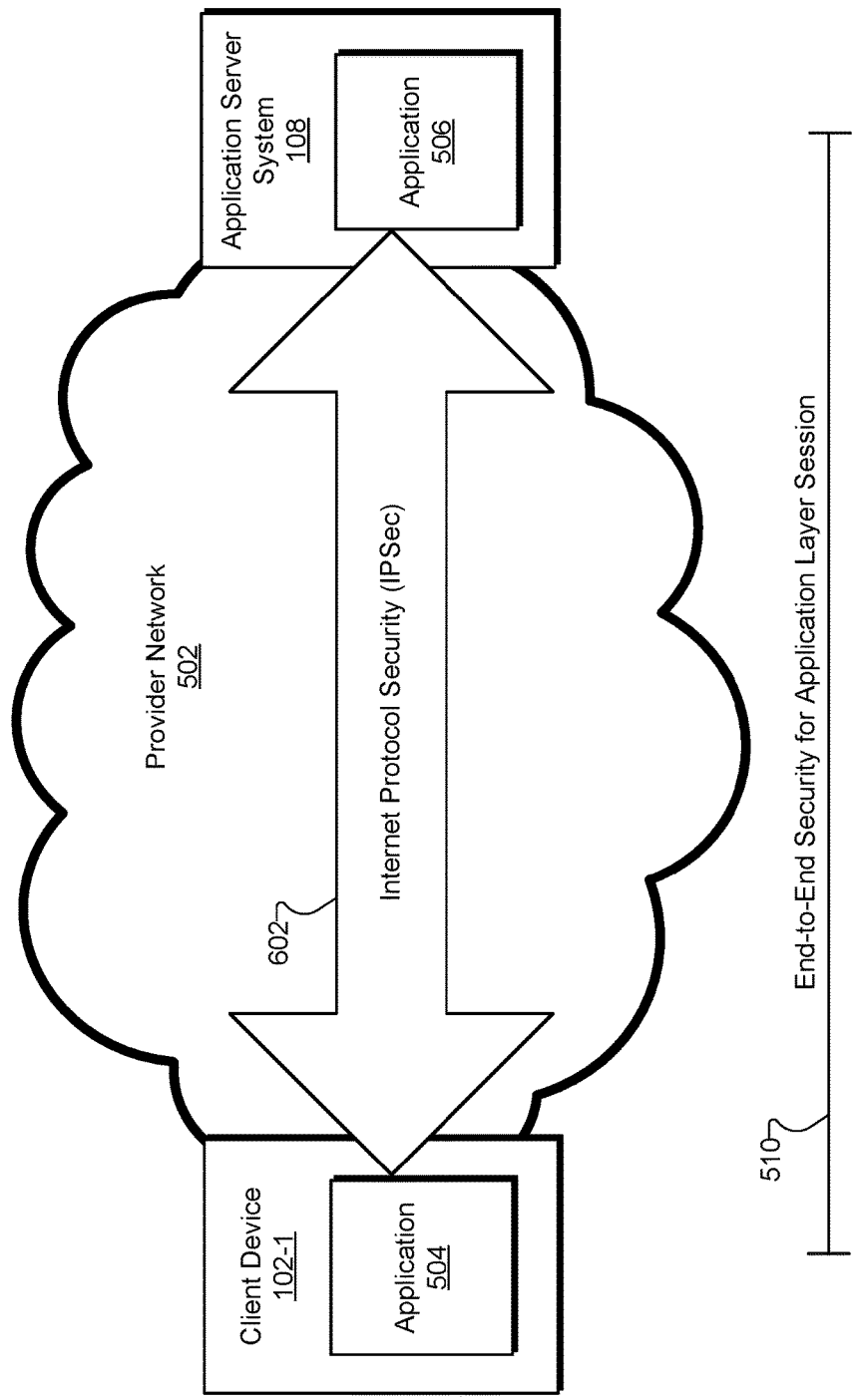
Figure 7:
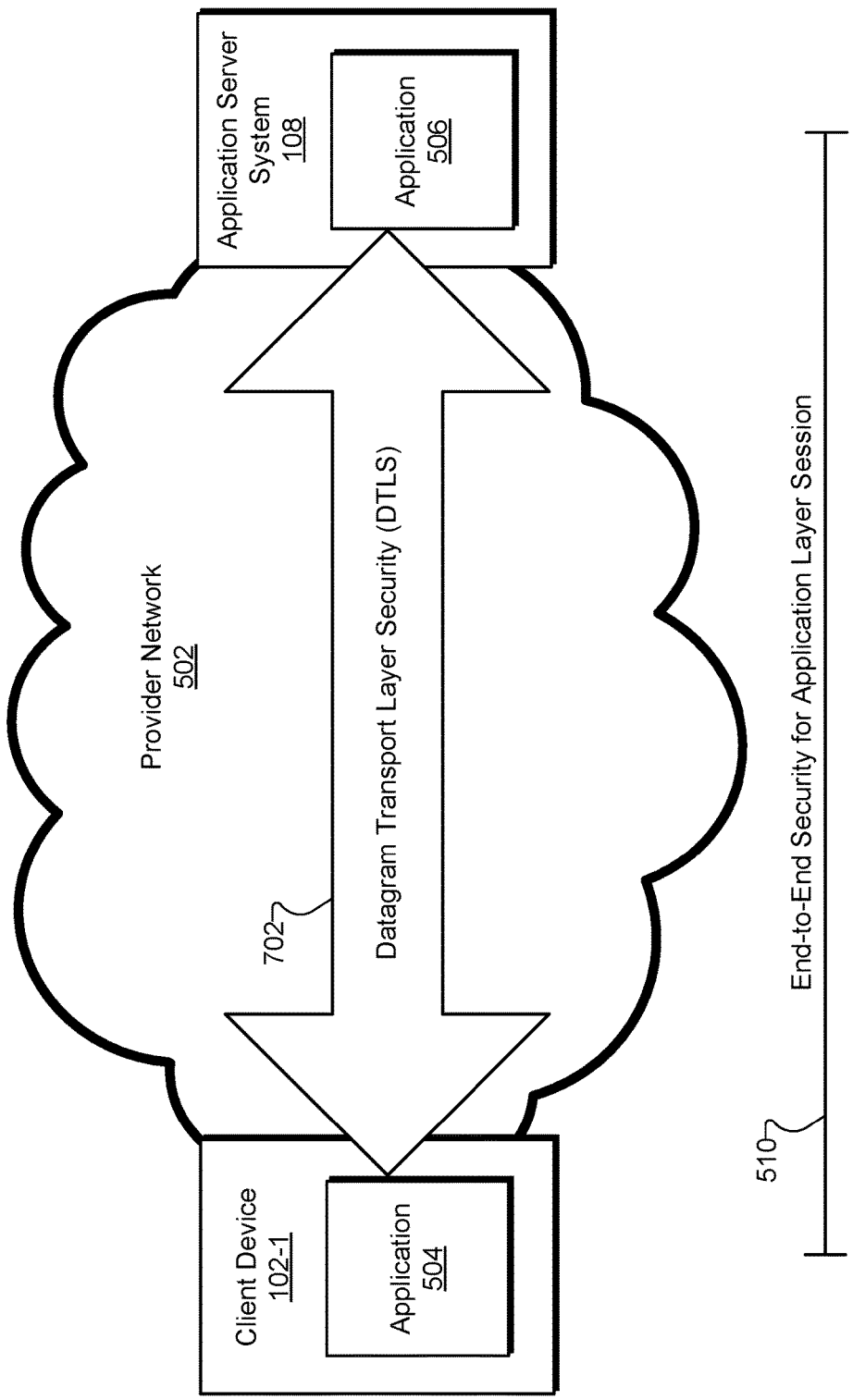

To illustrate, FIGS. 5-7 show exemplary security procedures that make use of a bootstrapped application layer session security keyset to provide end-to-end application layer session security between an application running on a client device and an application running on an application server system. More specifically, in FIGS. 5-7, client device 102-1 is communicatively coupled with application server system 108 via a provider network 502, which may be similar to or the same as provider network 110 (see FIG. 1), LTE provider network 302 (see FIG. 3), or any other provider network that adheres to certain principles described herein as may serve a particular implementation. As shown in FIGS. 5-7, client device 102-1 may be running an application 504 (e.g., application software running on a processor of client device 102-1). Application 504 may be in communication with (e.g., via an application layer session) an application 506 that may be running on application server system 108.

For example, as shown in FIG. 5 specifically, application 504 may be engaged in an application layer session 508 with application 506. To secure application layer session 508, a TLS-PSK procedure may be used where the application layer session security keyset bootstrapped according to the methods described above is employed directly as a pre-shared key (e.g., as opposed to having to bootstrap a key between client device 102-1 and application server system 108 using traditional methods of certificate passing, certificate authentication, public and private key passing, and the like). The TLS-PSK procedure depicted in FIG. 5 is exemplary only. In other examples, the application layer session security keyset may be used as a pre-shared key in another similar security procedure (e.g., an SSL procedure, an HTTPS procedure, etc.) for application layer session 508 as may serve a particular implementation.

Additionally, in certain examples, rather than using the application layer session security keyset directly as a pre-shared key in the security procedure, system 200 may use the application layer session security keyset to seed a DH session key derivation for the TLS-PSK procedure. Using the application layer session security keyset in this way may facilitate perfect forward secrecy so that every time a new application layer session is initiated, a new pre-shared key may be used based on the same application layer session security keyset.

As illustrated by an end-to-end indicator 510, by bootstrapping the application layer session security keyset based on the subscriber identity master security credential, both client device 102-1 and application server system 108 may use the application layer session security keyset to provide end-to-end application layer session security for application layer session 508. In other words, the application layer session security keyset may facilitate end-to-end application layer session security from application 504, running on client device 102-1, all the way across provider network 502 and up to application 506, running on application server system 108.

In FIG. 6, an application layer session 602 is shown in place of application layer session 508 of FIG. 5. As illustrated, in application layer session 602, the application layer session security keyset may be used as a pre-shared key for an IPSec procedure. In some examples, the IPSec procedure used for application layer session 602 may include an IKE, while in other examples, the IPSec procedure may not include any IKE. Similarly, as another example of a security procedure that may be used to secure an application layer session, FIG. 7 shows an application layer session 702 between client device 102-1 and application server system 108. As illustrated, in application layer session 702, the application layer session security keyset may be used as a pre-shared key for a DTLS procedure. As with the example of FIG. 5, application layer sessions 602 and 702 may each benefit from end-to-end application layer session security as illustrated by indicator 510 in both FIGS. 6 and 7.

Figure 8:
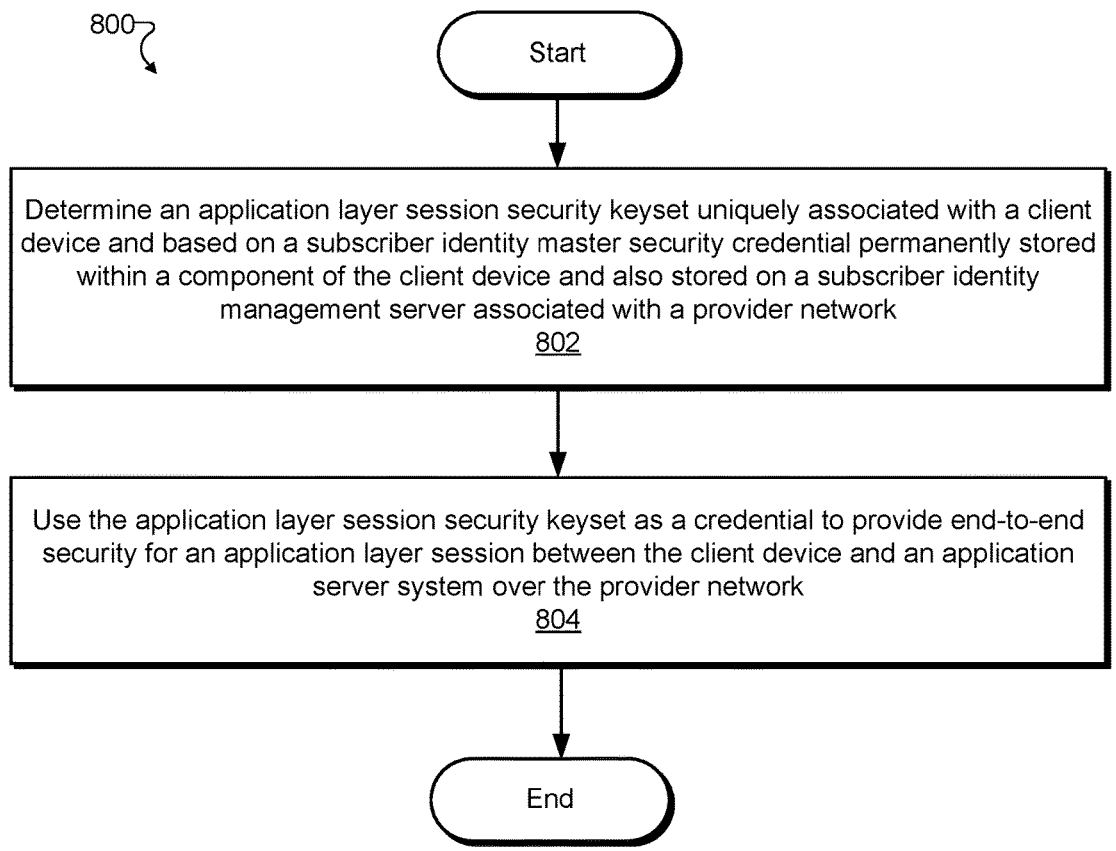
FIGS. 8-9 illustrate exemplary methods for bootstrapping an end-to-end application layer session security keyset based on a subscriber identity master security credential according to principles described herein.

FIG. 8 illustrates an exemplary method 800 for bootstrapping an end-to-end application layer session security keyset based on a subscriber identity master security credential. While FIG. 8 illustrates exemplary operations according to one embodiment, other embodiments may omit, add to, reorder, and/or modify any of the operations shown in FIG. 8. One or more of the operations shown in FIG. 8 may be performed by system 200 and/or any implementation thereof.

In operation 802, a security key bootstrapping system may determine an application layer session security keyset uniquely associated with a client device. For example, the application layer session security keyset may be based on a subscriber identity master security credential that is stored within a component of the client device and is also stored on a subscriber identity management server associated with a provider network by which the client device is communicatively coupled with an application server system. Operation 802 may be performed in any of the ways described herein.

In operation 804, the security key bootstrapping system may use the application layer session security keyset determined in operation 802 as a credential to provide end-to-end security for an application layer session between the client device and the application server system. For example, the application layer session between the client device and the application server system may be carried over the provider network. Operation 804 may be performed in any of the ways described herein. For instance, in some examples, neither the component of the client device nor the subscriber identity management server may obtain the subscriber identity master security credential from an exchange of the subscriber identity master security credential over the provider network.

Figure 9:
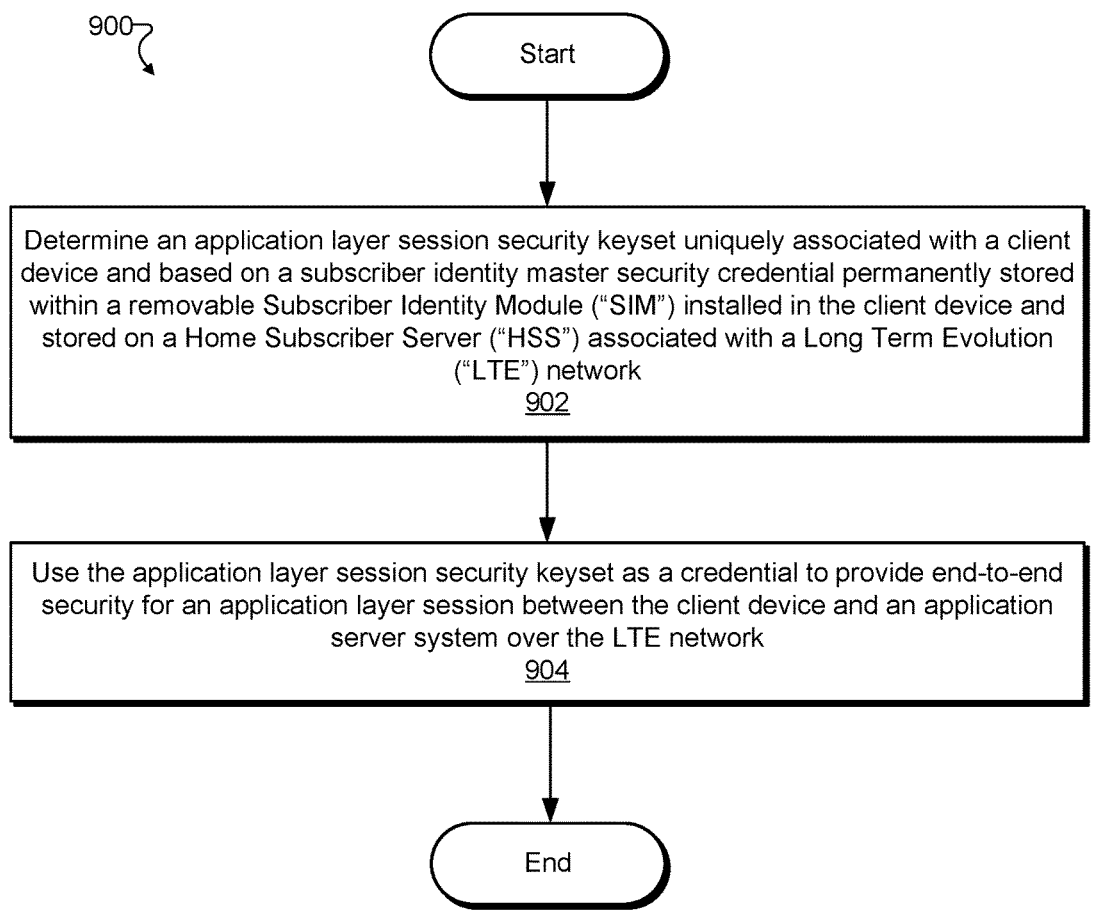

FIG. 9 illustrates an exemplary method 900 for bootstrapping an end-to-end application layer session security keyset based on a subscriber identity master security credential. While FIG. 9 illustrates exemplary operations according to one embodiment, other embodiments may omit, add to, reorder, and/or modify any of the operations shown in FIG. 9. One or more of the operations shown in FIG. 9 may be performed by system 200 and/or any implementation thereof.

In operation 902, a security key bootstrapping system may determine an application layer session security keyset. For example, the application layer session security keyset may be uniquely associated with a client device and may be based on a subscriber identity master security credential permanently stored within a removable Subscriber Identity Module ("SIM") installed in the client device, as well as stored on a Home Subscriber Server ("HSS") associated with a Long Term Evolution ("LTE") network. In some examples, the HSS associated with the LTE network may be configured to store profile data representative of a plurality of subscribers to the LTE network. The LTE network may communicatively couple the client device with an application server system. Additionally, the LTE network may be configured to provide data service to the plurality of subscribers via an Evolved Packet Core ("EPC") framework that includes the HSS. Operation 902 may be performed in any of the ways described herein.

In operation 904, a security key bootstrapping system may use the application layer session security keyset as a credential to provide end-to-end security for an application layer session between the client device and the application server system over the LTE network. Operation 904 may be performed in any of the ways described herein. For instance, in some examples, neither the SIM installed in the client device nor the HSS may obtain the subscriber identity master security credential from an exchange of the subscriber identity master security credential over the LTE network.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 10:
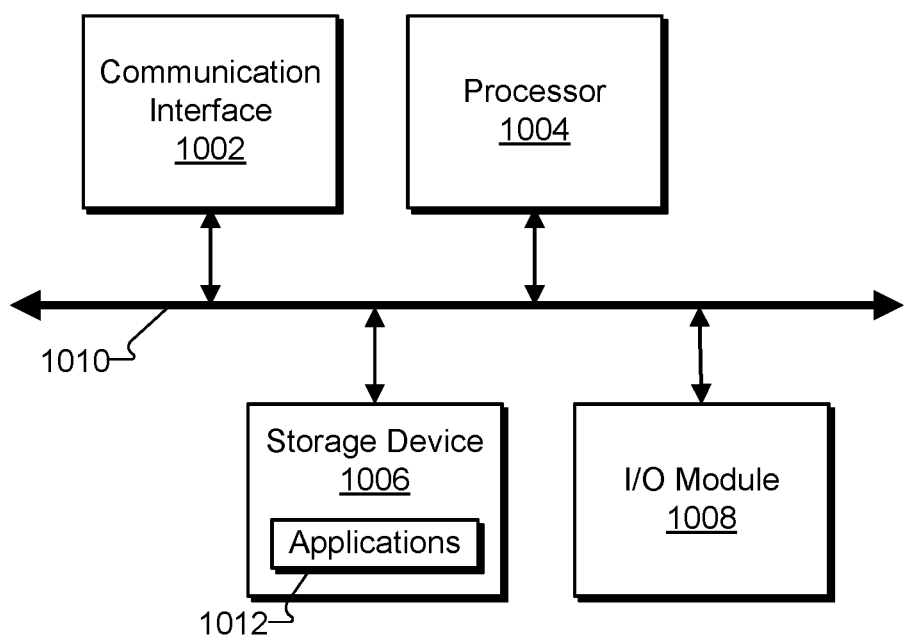
FIG. 10 illustrates an exemplary computing device according to principles described herein.

FIG. 10 illustrates an exemplary computing device 1000 that may be specifically configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with keyset management facility 202 of system 200 (see FIG. 2). Likewise, storage facility 204 of system 200 may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   determining, by a security key bootstrapping system, an application layer session security keyset uniquely associated with a client device and based on a subscriber identity master security credential, the subscriber identity master security credential permanently stored within a component of the client device and stored on a subscriber identity management server associated with a provider network by which the client device is communicatively coupled with an application server system, the determining of the application layer session security keyset including:
      receiving a first authentication vector associated with a first key derivation function of an Evolved Packet System-Authorization and Key Agreement ("EPS-AKA") algorithm, the first authentication vector associated with providing ciphering and integrity protection security for a connection between the client device and one or more network elements of the provider network,
      receiving a second authentication vector associated with a second key derivation function of the EPS-AKA algorithm, the second authentication vector associated with providing end-to-end security for an application layer session between the client device and the application server system, and
      computing, based on the second authentication vector and further based on the subscriber identity master security credential, the application layer session security keyset; and
   using, by the security key bootstrapping system, the application layer session security keyset as a credential to provide the end-to-end security for the application layer session between the client device and the application server system over the provider network;
   wherein neither the component of the client device nor the subscriber identity management server obtains the subscriber identity master security credential from an exchange of the subscriber identity master security credential over the provider network.

2. The method of claim 1, wherein:
   the provider network is a Long Term Evolution ("LTE") network configured to provide data service to a plurality of subscribers via an Evolved Packet Core ("EPC") framework; and
   the subscriber identity management server is a Home Subscriber Server ("HSS") that is associated with the EPC framework of the LTE network and that is configured to store profile data representative of the plurality of subscribers.

3. The method of claim 1, wherein the subscriber identity management server is communicatively coupled with the application server system via a trusted network connection separate from one or more network connections by which the client device is communicatively coupled with the application server system, the subscriber identity management server configured to:
   receive, from the application server system over the trusted network connection, a request to transmit the application layer session security keyset to the application server system over the trusted network connection, the request including a key identifier representative of the application layer session security keyset and obtained by the application server system from the client device over the one or more network connections by which the client device is communicatively coupled with the application server system; and
   transmit, in response to the request and based on the key identifier, the application layer session security keyset to the application server system.

4. The method of claim 1, wherein the using of the application layer session security keyset as the credential to provide the end-to-end security for the application layer session between the client device and the application server system includes using the application layer session security keyset for integrity protection of the application layer session and using the application layer session security keyset for ciphering of the application layer session.

5. The method of claim 1, wherein the component of the client device upon which the subscriber identity master security credential is permanently stored is a removable Subscriber Identity Module ("SIM") installed in the client device.

6. The method of claim 1, wherein the component of the client device upon which the subscriber identity master security credential is permanently stored is a non-removable storage component built into the client device.

7. The method of claim 1, wherein:
   the security key bootstrapping system comprises the component of the client device;
   the component of the client device performs the exchanging of the first and second authentication vectors by receiving the first and second authentications vectors from the subscriber identity management server; and
   the client device performs the computing of the application layer session security keyset based on the subscriber identity master security credential permanently stored within the component of the client device in accordance with the second key derivation function of the EPS-AKA algorithm and independently from a second computing of the application layer session security keyset performed by the subscriber identity management server.

8. The method of claim 1, wherein:
   the security key bootstrapping system comprises the subscriber identity management server;
   the subscriber identity management server performs the exchanging of the first and second authentication vectors by transmitting the first and second authentication vectors to the component of the client device; and
   the subscriber identity management server performs the computing of the application layer session security keyset based on the subscriber identity master security credential stored on the subscriber identity management server in accordance with the second key derivation function of the EPS-AKA algorithm and independently from a second computing of the application layer session security keyset performed by the client device.

9. The method of claim 1, wherein the using of the application layer session security keyset as the credential to provide the end-to-end security for the application layer session between the client device and the application server system is performed by at least one of:
  using the application layer session security keyset as a pre-shared key in a Transport Layer Security-Pre-Shared Key ("TLS-PSK") procedure;
  using the application layer session security keyset to seed a Diffie-Hellman ("DH") session key derivation for the TLS-PSK procedure;
  using the application layer session security keyset as a pre-shared key in an Internet Protocol Security ("IP-Sec") procedure that involves an Internet Key Exchange ("IKE") procedure;
  using the application layer session security keyset as a pre-shared key in an IPSec procedure that does not involve an IKE procedure; and
  using the application layer session security keyset as a pre-shared key in a Datagram Transport Layer Security ("DTLS") procedure.

10. The method of claim 1, embodied as computer-executable instructions on at least one non-transitory computer-readable medium.

11. A method comprising:
  determining, by a security key bootstrapping system, an application layer session security keyset uniquely associated with a client device and based on a subscriber identity master security credential, the subscriber identity master security credential permanently stored within a removable Subscriber Identity Module ("SIM") installed in the client device and stored on a Home Subscriber Server ("HSS") associated with a Long Term Evolution ("LTE") network and configured to store profile data representative of a plurality of subscribers to the LTE network, the LTE network configured to provide data service to the plurality of subscribers via an Evolved Packet Core ("EPC") framework that includes the HSS and communicatively coupling the client device with an application server system, the determining of the application layer session security keyset including:
    receiving a first authentication vector associated with a first key derivation function of an Evolved Packet System-Authorization and Key Agreement ("EPS-AKA") algorithm, the first authentication vector associated with providing ciphering and integrity protection security for a connection between the client device and one or more network elements of the provider network,
    receiving a second authentication vector associated with a second key derivation function of the EPS-AKA algorithm, the second authentication vector associated with providing end-to-end security for an application layer session between the client device and the application server system, and
    computing, based on the second authentication vector and further based on the subscriber identity master security credential, the application layer session security keyset; and
  using, by the security key bootstrapping system, the application layer session security keyset as a credential to provide end-to-end security for the application layer session between the client device and the application server system over the LTE network;
  wherein neither the SIM installed in the client device nor the HSS obtains the subscriber identity master security credential from an exchange of the subscriber identity master security credential over the LTE network.

12. The method of claim 11, embodied as computer-executable instructions on at least one non-transitory computer-readable medium.

13. A system comprising:
  at least one physical computing device that:
    determines an application layer session security keyset uniquely associated with a client device and based on a subscriber identity master security credential permanently stored within a component of the client device and stored on a subscriber identity management server by:
      receiving a first authentication vector associated with a first key derivation function of an Evolved Packet System-Authorization and Key Agreement ("EPS-AKA") algorithm, the first authentication vector associated with providing ciphering and integrity protection security for a connection between the client device and one or more network elements of a provider network associated with the subscriber identity management server and by which the client device is communicatively coupled with an application server system,
      receiving a second authentication vector associated with a second key derivation function of the EPS-AKA algorithm, the second authentication vector associated with providing end-to-end security for an application layer session between the client device and the application server system, and
      computing, based on the second authentication vector and further based on the subscriber identity master security credential, the application layer session security keyset; and
    uses the application layer session security keyset as a credential to provide the end-to-end security for the application layer session between the client device and the application server system over the provider network;
  wherein neither the component of the client device nor the subscriber identity management server obtains the subscriber identity master security credential from an exchange of the subscriber identity master security credential over the provider network.

14. The system of claim 13, wherein:
  the provider network is a Long Term Evolution ("LTE") network configured to provide data service to a plurality of subscribers via an Evolved Packet Core ("EPC") framework;
  the subscriber identity management server is a Home Subscriber Server ("HSS") that is associated with the EPC framework of the LTE network and is communicatively coupled with the application server system via a trusted network connection separate from one or more network connections by which the client device is communicatively coupled with the application server system; and
  the HSS is configured to:
    store profile data representative of the plurality of subscribers,
    receive, from the application server system over the trusted network connection, a request to transmit the application layer session security keyset to the application server system over the trusted network connection, the request including a key identifier representative of the application layer session security keyset and obtained by the application server system from the client device over the one or more network connections by which the client device is communicatively coupled with the application server system, and transmit, in response to the request and based on the key identifier, the application layer session security keyset to the application server system.

15. The system of claim 13, wherein the use of the application layer session security keyset as the credential to provide the end-to-end security for the application layer session between the client device and the application server system includes using the application layer session security keyset for integrity protection of the application layer session and using the application layer session security keyset for ciphering of the application layer session.

16. The system of claim 13, wherein the component of the client device upon which the subscriber identity master security credential is permanently stored is a removable Subscriber Identity Module ("SIM") installed in the client device.

17. The system of claim 13, wherein the component of the client device upon which the subscriber identity master security credential is permanently stored is a non-removable storage component built into the client device.

18. The system of claim 13, further comprising the component of the client device and wherein:

the component of the client device performs the exchanging of the first and second authentication vectors by receiving the first and second authentications vectors from the subscriber identity management server; and the client device performs the computing of the application layer session security keyset based on the subscriber identity master security credential permanently stored within the component of the client device in accordance with the second key derivation function of the EPS-AKA algorithm and independently from a second computing of the application layer session security keyset performed by the subscriber identity management server.

19. The system of claim 13, further comprising the subscriber identity management server and wherein:

the subscriber identity management server performs the exchanging of the first and second authentication vectors by transmitting the first and second authentication vectors to the component of the client device; and the subscriber identity management server performs the computing of the application layer session security keyset based on the subscriber identity master security credential stored on the subscriber identity management server in accordance with the second key derivation function of the EPS-AKA algorithm and independently from a second computing of the application layer session security keyset performed by the client device.

20. The system of claim 13, wherein the use of the application layer session security keyset as the credential to provide the end-to-end security for the application layer session between the client device and the application server system is performed by at least one of:

use of the application layer session security keyset as a pre-shared key in a Transport Layer Security-Pre-Shared Key ("TLS-PSK") procedure;

use of the application layer session security keyset to seed a Diffie-Hellman ("DH") session key derivation for the TLS-PSK procedure;

use of the application layer session security keyset as a pre-shared key in an Internet Protocol Security ("IPSec") procedure that involves an Internet Key Exchange ("IKE") procedure;

use of the application layer session security keyset as a pre-shared key in an IPSec procedure that does not involve an IKE procedure; and use of the application layer session security keyset as a pre-shared key in a Datagram Transport Layer Security ("DTLS") procedure.

* * * * *